United States Patent [19]
De Caris et al.

[11] Patent Number: 5,750,938
[45] Date of Patent: May 12, 1998

[54] METHOD OF WEIGHING DRUGS AND RELATIVE DRUG METERING MACHINE

[75] Inventors: Sandro De Caris, Pianoro; Angelo Ansaloni, Crespellano, both of Italy

[73] Assignee: MG2 S.p.A., Italy

[21] Appl. No.: 326,929

[22] Filed: Oct. 21, 1994

[30] Foreign Application Priority Data

Oct. 22, 1993 [IT] Italy .................. B093 A 000418

[51] Int. Cl.⁶ .................. G01G 19/52; G01D 18/00; B07C 5/344
[52] U.S. Cl. .................. 177/50; 177/54; 177/83; 177/52; 73/1.13; 73/1.16; 73/865; 209/571; 364/571.01
[58] Field of Search .................. 177/50, 52, 53, 177/54, 55, 56, 83, 210 C, 1, 25.11, 25.13; 361/280, 281, 285; 364/567, 568, 571.01; 73/1 B, 865, 861.14, 1.13, 1.16; 324/661, 663; 209/571, 572, 645, 649

[56] References Cited

U.S. PATENT DOCUMENTS

| | | | |
|---|---|---|---|
| 4,223,751 | 9/1980 | Ayers et al. | 177/210 C |
| 4,402,412 | 9/1983 | Wood | 209/625 |
| 4,407,379 | 10/1983 | Pryor et al. | 177/52 |
| 4,499,961 | 2/1985 | Fukuda | 177/25.18 |
| 4,640,376 | 2/1987 | Hinzpeter | 177/50 |
| 4,712,627 | 12/1987 | Harrington et al. | 177/50 |
| 4,715,412 | 12/1987 | Perazzo | 177/55 X |
| 4,794,996 | 1/1989 | Wallace et al. | 177/25.14 |
| 4,811,802 | 3/1989 | Yamamoto et al. | 177/1 |
| 5,109,936 | 5/1992 | Ruppel | 177/50 |
| 5,135,113 | 8/1992 | Mayer et al. | 209/539 X |
| 5,191,543 | 3/1993 | Berthel et al. | 364/567 |
| 5,439,036 | 8/1995 | Krämer | 141/83 |
| 5,539,157 | 7/1996 | Kobayashi et al. | 177/50 |
| 5,596,179 | 1/1997 | Sakaeda | 177/25.18 |

FOREIGN PATENT DOCUMENTS 1 488 345  10/1977  United Kingdom.

Primary Examiner—Michael L. Gellner
Assistant Examiner—Randy W. Gibson
Attorney, Agent, or Firm—Finnegan, Henderson, Farabow, Garrett & Dunner, L.L.P.

[57] ABSTRACT

A drug weighing method presenting the steps of feeding an orderly succession of drugs to a capacitive sensor; determining the weight of each drug by means of the capacitive sensor;

periodically weighing a number of drugs in the succession by means of a precision scale;
and periodically calibrating the capacitive sensor on the basis of the directly determined drug weights.

16 Claims, 4 Drawing Sheets

METHOD OF WEIGHING DRUGS AND RELATIVE DRUG METERING MACHINE

BACKGROUND OF THE INVENTION

The present invention relates to a method of weighing drugs.

In the following description, specific reference is made, purely by way of example, to a method of weighing drugs metered into capsules.

For metering drugs into capsules, metering systems are used whereby an orderly succession of empty capsules is fed through a metering unit by which they are filled with a predetermined amount of drug to form respective full capsules.

In known metering systems of the above type, the drug content of the capsules is normally controlled statistically by means of a first and second weighing unit up- and downstream from the metering unit in the traveling direction of the capsules. The first weighing unit provides for determining the weight of empty capsules in a given sample group, and the second weighing unit for determining the weight of each full capsule in the same sample group. Both weighing units are connected to a data processing system which, for each capsule in the sample group, determines the difference between the weights detected by the two weighing units, and whether the drug content of the capsule falls within a given acceptance range.

The above control method presents several drawbacks, all due to the weight of the drug content of the capsules being controlled statistically. That is, only the capsules in certain sample groups, as opposed to all the capsules in the succession, are controlled, with the result that certain capsules with other than the predetermined drug content may go undetected.

In other metering systems, the above problem is solved using a sensor, usually a capacitive type, located downstream from the metering unit in the traveling direction of the capsules, and through which the full capsules are fed successively. As it travels through the sensor, each capsule produces a variation in the capacitance of the sensor (variation of the dielectric interposed between the armatures of the sensor) on the basis of which the weight of the full capsules is determined. The weight of the content of each capsule is then determined as the difference between the weight of the full capsule determined by the sensor, and the weight of the empty capsule determined statistically as described previously.

Though it does provide for determining the weight of the content of each capsule, thus solving the problems posed by statistical control, the above method falls short in terms of accuracy. Firstly, the weight of the empty capsules is determined indirectly and not for each capsule; and, secondly, the variation in the capacitance of the sensor is affected not only by the type of drug but also by the state of the drug in each capsule, and by the characteristics of the capsules themselves, which, as is known, vary from one capsule to another.

SUMMARY OF THE INVENTION

It is an object of the present invention to provide a method of weighing drugs.

According to the present invention, there is provided a method of weighing drugs fed successively along a path to a sensor which, for each drug, emits a signal correlated to the weight of the drug; characterized in that it comprises a first step for directly determining the weight of a number of drugs; and a second step for calibrating the sensor as a function of the weights of the drugs in said number of drugs.

The present invention also relates to a drug metering machine.

According to the present invention, there is provided a drug metering machine comprising conveying means for successively feeding drugs along a given path; and at least one unit for weighing the drugs; the weighing unit comprising at least one sensor located along said path and which, for each drug, emits a signal correlated to the weight of the drug; characterized in that said weighing unit also comprises direct weighing means for directly determining the weight of a number of drugs; and control means for controlling said sensor, and for calibrating the sensor as a function of the weights determined by said direct weighing means.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
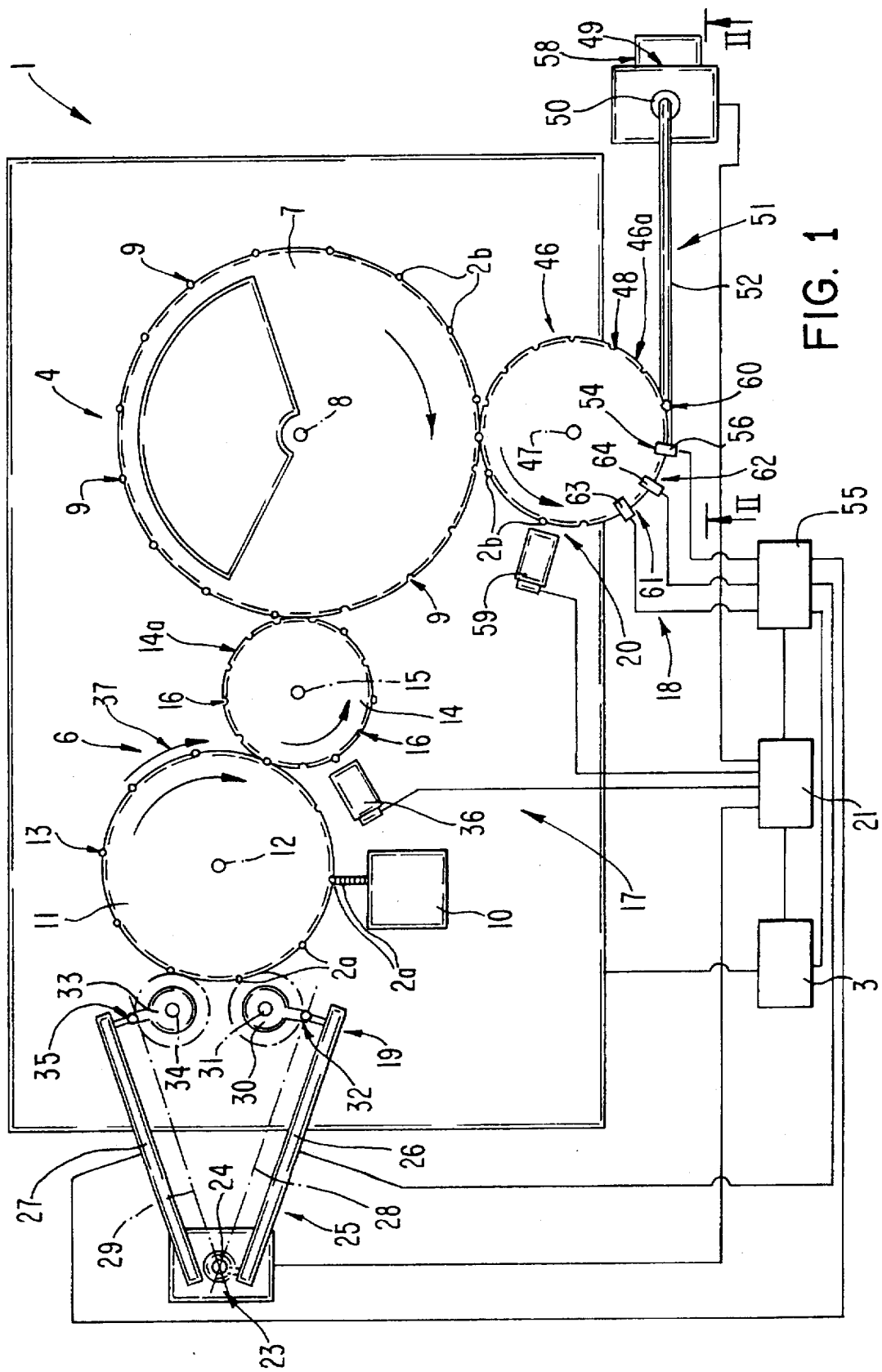
FIG. 1 shows, schematically, a preferred embodiment of a drug metering machine in accordance with the present invention.
Figure 3:
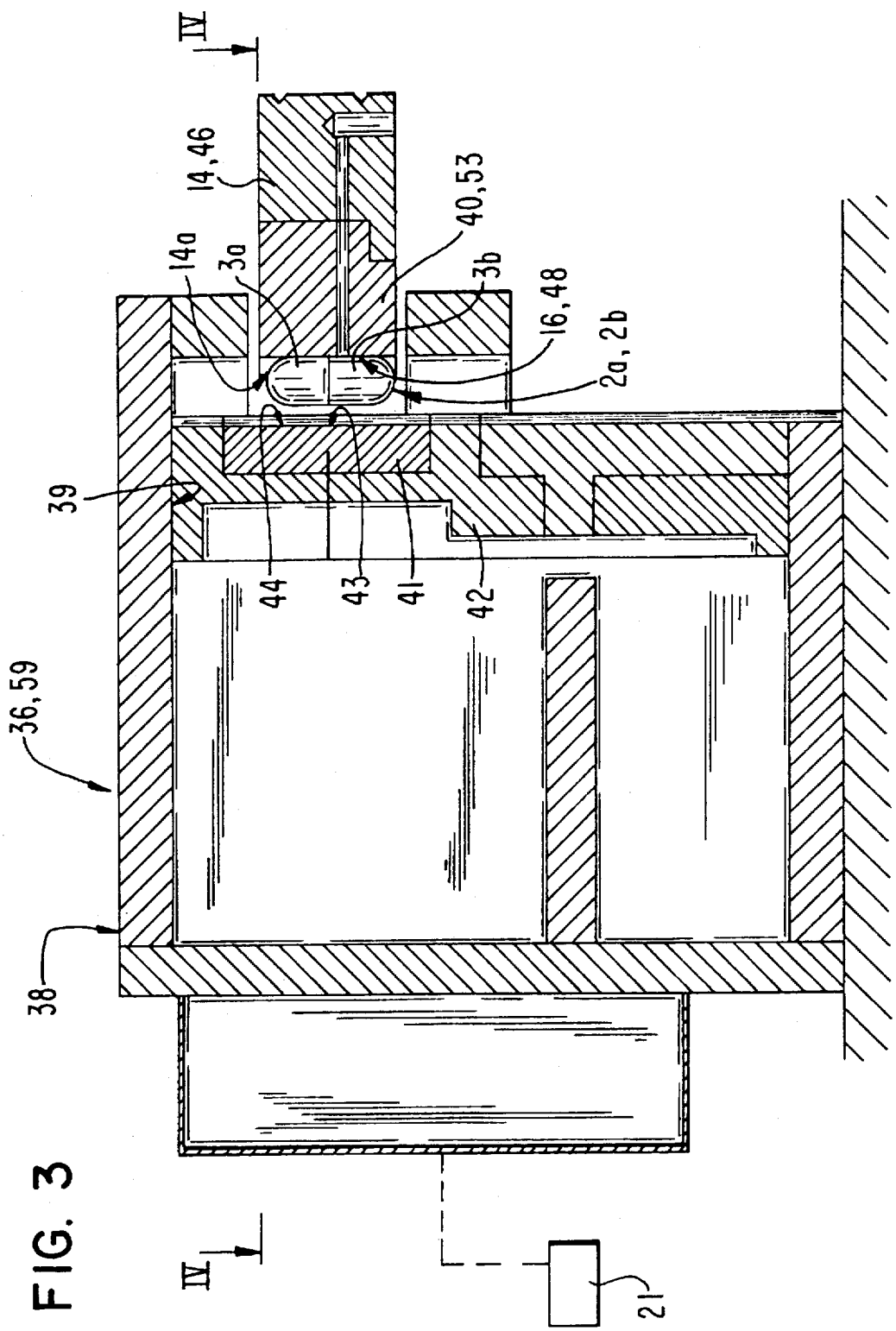
FIG. 3 shows a larger-scale section of a detail in FIG. 1.
Figure 5:
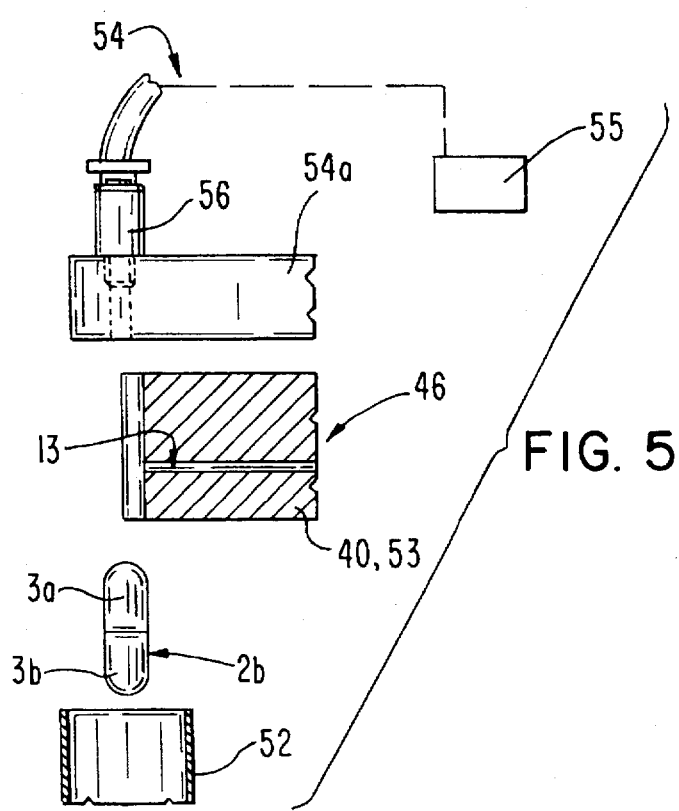
FIG. 5 shows a section of a detail in FIG. 2.

Number 1 in FIG. 1 indicates a machine for metering drugs into hard gelatin capsules 2 defined by a bottom shell 3a and a top shell 3b closing the opening in bottom shell 3a (FIGS. 3 and 5).

Machine 1 is controlled by a control system 3, and comprises a known metering unit 4, and a feed unit 6 for supplying the input of metering unit 4 with an orderly succession of empty capsules 2a. Metering unit 4 comprises a metering drum 7 rotating clockwise (in FIG. 1) about an axis 8 perpendicular to the FIG. 1 plane, and presenting a number of peripheral seats 9 for receiving and retaining by suction respective capsules 2; a known parting unit (not shown) for opening empty capsules 2a; a number of known metering devices (not shown) associated with drum 7, for feeding in known manner into each capsule 2a a given amount of drug which, in the example described, is in powder form; and, finally, a closing unit for closing each drug-filled capsule 2a and forming a number of full capsules 2b.

Again with reference to FIG. 1, feed unit 6 comprises a known feed device 10 for forming said orderly succession of empty capsules 2a; a drum 11 rotating clockwise (in FIG. 1) about an axis 12 parallel to axis 8, and presenting a number of peripheral seats 13 for receiving and retaining by suction respective empty capsules 2a; and a further drum 14 rotating anticlockwise about an axis 15 parallel to axes 8 and 12, and which is tangent to both drums 7 and 11, and presents a number of equally spaced seats 16 formed in its outer surface 14a, for receiving and retaining by suction respective capsules 2a.

Again with reference to FIG. 1, machine 1 also comprises a control unit 17 for determining the amount of drug fed by said metering devices (not shown) into each capsule 2a; and a capsule sorting unit 18 for supplying a known packing machine (not shown) with full capsules 2b whose drug weight falls within a given acceptance range, and for rejecting any nonconforming capsules. More specifically, unit 17 provides for controlling each capsule 2 in said succession, and comprises a first and second weighing unit 19 and 20 for respectively determining the weight of each empty capsule 2a and corresponding full capsules 2b, and which are connected electrically to a processing and control system 21 which, on the basis of the signals received from units 19 and 20, determines the drug weight of each capsule as the difference between the weight of full capsule 2b and that of the corresponding empty capsule 2a.

Unit 19 comprises a weighing station 23 with a precision scale 24 connected electrically to control system 21; and a transfer device 25 controlled by system 21 and which provides for feeding a number of empty capsules 2a to and from weighing station 23. Device 25 comprises a known supply conveyor 26 and a known unloading conveyor 27 for feeding empty capsules 2a along respective straight paths 28 and 29 converging at station 23; and a first powered pickup member 30 interposed between conveyor 26 and drum 11, rotating anticlockwise about an axis 31 parallel to axes 12 and 15, and presenting a suction seat 32 for receiving and retaining by suction an empty capsule 2a, and which is moved by member 30 along a circular path coaxial with axis 31 and tangent to both drum 11 and path 28. Device 25 also comprises a second powered unloading member 33 interposed between drum 11 and conveyor 27, rotating about an axis 34 parallel to axis 31, and presenting a suction seat 35 for receiving and retaining an empty capsule 2a and movable along a circular path coaxial with axis 34 and tangent to drum 11 and path 29. Members 30 and 33 rotate in time with each other and at such an angular speed as to move respective seats 32 and 35 at the same surface speed as seats 13 on drum 11, so that when member 30 removes a capsule 2a off drum 11, member 33 deposits a capsule 2a from weighing station 23 into the vacated seat 13.

A capacitive sensor 36 (FIGS. 1, 3, 4) is located at drum 14 and along the path 37 of capsules 2, and which, for each empty capsule 2a, successively supplies control system 21 with a first signal correlated to the weight of empty capsule 2a, and a second zero (no-load) signal indicating the absence of capsules inside seats 16.

Figure 4:
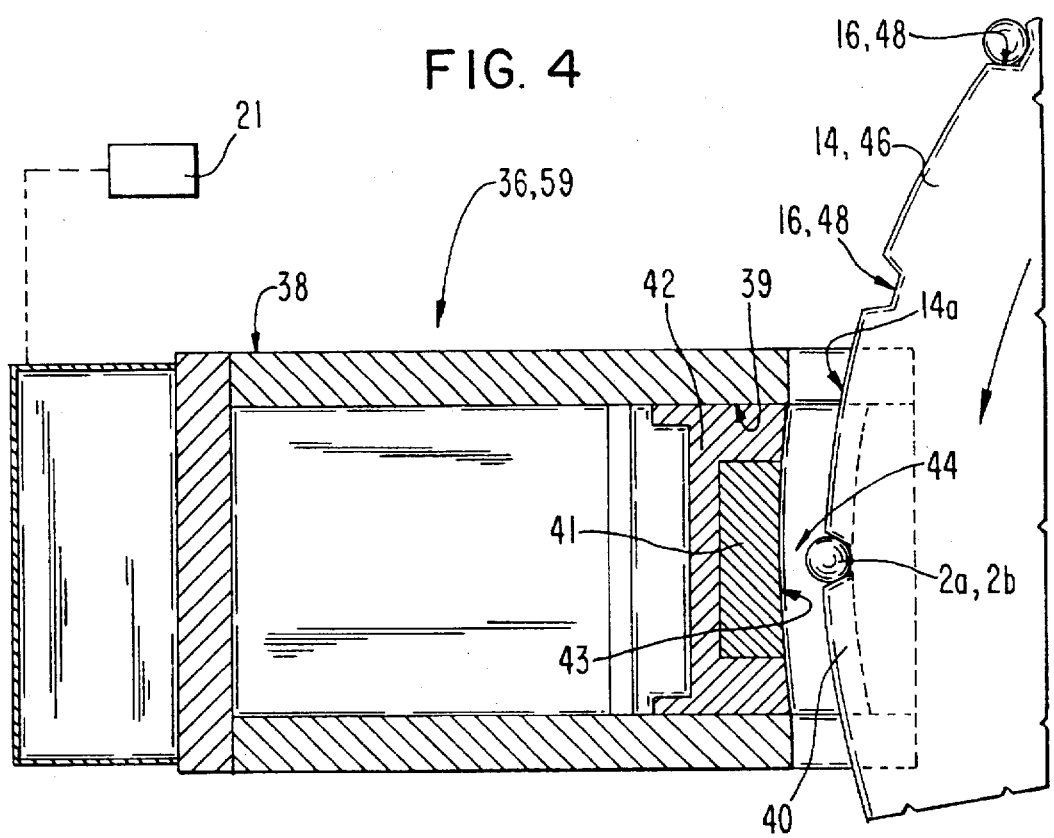
FIG. 4 shows a section along line IV—IV in FIG. 3.

As shown in FIGS. 3 and 4, sensor 36 comprises an outer casing 38 with an opening 39 facing drum 14; and two armatures, one of which is movable and defined by an outer peripheral portion 40 of drum 14, and the other of which is fixed and defined by a metal plate 41. Plate 41 is connected integral with a plastic element 42 closing opening 39, extends facing surface 14a of drum 14, and is defined, on the side facing surface 14a, by a convex surface 43 separated from surface 14a by a given distance greater than the width of capsules 2. Surfaces 14a and 43 define a channel 44 inside which empty capsules 2a are fed successively by drum 14. As it travels through channel 44, each empty capsule 2a causes a variation in the capacitance of sensor 36, which, as is known, depends on the dielectric constant of the means interposed between the armatures and, in this case, is affected by the dielectric constant and the mass of empty capsules 2a. More specifically, when a capsule 2a is located between the armatures (FIGS. 3 and 4), the capacitance of sensor 36 is expressed by the following equation:

$$C=C0*(1+K1c*mc) \tag{1}$$

where: C is the capacitance of sensor 36 in the above condition; C0 is the no-load capacitance of sensor 36; mc is the mass of empty capsule 2a; and K1c is a coefficient depending mainly on the dielectric constant of empty capsule 2a.

Bearing in mind equation (1) and given the value of coefficient K1c, it is therefore possible to determine the value of mass mc by determining, via sensor 36 and for each capsule 2a, a first no-load value d0c, and a second value d1c in the presence of an empty capsule 2a between the armatures. Mass mc is related to a value v1=(d1c−d0c)/d0c by the following equation:

$$mc=v1/K1c \tag{2}$$

Again with reference to FIG. 1, at the output of metering unit 4, each full capsule 2b is fed by drum 7 to unit 20 which is similar in construction to unit 19, and comprises a drum 46 rotating anticlockwise (in FIG. 1) about an axis 47 parallel to axes 8 and 15. Drum 46 is tangent to drum 7, and presents a number of equally spaced seats 48 formed in its outer lateral surface 46a, for receiving and retaining by suction respective full capsules 2b.

Unit 20 also comprises a weighing station 49 with a precision scale 50 for weighing full capsules 2b. Scale 50 is connected electrically to control systems 21, and is supplied with capsules 2b by a pickup and feed device 51 for successively removing a number of full capsules 2b off drum 46 and feeding them to scale 50.

Figure 2:
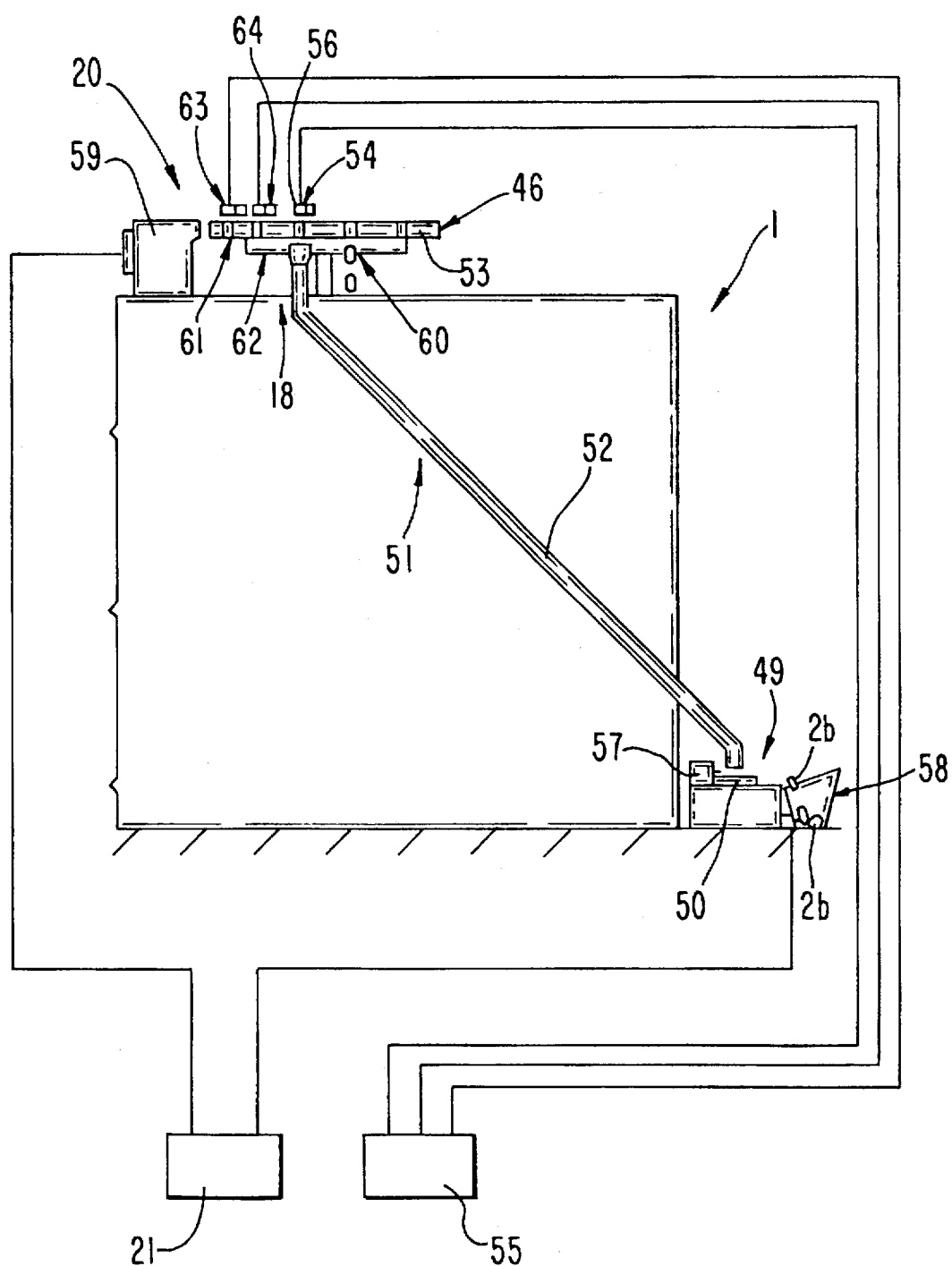
FIG. 2 shows a view along line II—II in FIG. 1.

With reference to FIG. 2, device 51 comprises a conduit 52, the output of which extends over scale 50, and the input of which is located beneath a peripheral metal portion 53 of drum 46, for successively receiving full capsules 2b housed inside respective seats 48. Full capsules 2b are transferred from drum 46 to the input of conduit 52 by a pneumatic expulsion system 54 (FIGS. 2 and 5) comprising a pneumatic system 55 controlled by system 21, and a nozzle 56. Nozzle 56 is connected to a fixed supporting plate 54a on the opposite side of drum 46 in relation to the input of conduit 52, and provides for directing a stream of pressurized fluid on to capsules 2b for feeding them into the input of conduit 52. Finally, device 51 comprises a pregumatic expulsion member 57 (FIG. 2) close to scale 50, for feeding the weighed full capsules 2b from scale 50 into a bin 58.

Weighing unit 20 also comprises a capacitive sensor 59 (FIGS. 1 and 2) geometrically similar to and operating in the same way as sensor 36, and which is also connected electrically to control system 21. More specifically, capacitive sensor 59 comprises a movable armature defined by portion 53 of drum 46, and, as sensor 59 provides for detecting the weight of full capsules 2b, the variation in its capacitance is affected not only by the dielectric constant of the capsule but also by that of the drug, so that sensor 59 reads a value v2 equal to:

$$v2=K2c*mc+K2p*mp \tag{3}$$

where: v2=(d2p−d0p)/d0p; d2p is the value of the measurement in the presence of a capsule 2b; d0p is the value of the measurement in the absence of capsule 2b; mc is the weight of the empty capsule; Kc and Kp are the respective coefficients of empty capsule 2a and the drug content of capsule 2a; and mp is the drug weight.

Combining equations (1) and (3) gives the following equation expressing the mass mp of the drug as a function of the values supplied by the two sensors and of coefficients K1c, K2c, K2p:

$$mp=(v2/K2p)-(v1*K2c/(K2p*K1c)) \tag{4}$$

Again with reference to FIG. 1, once checked, full capsules 2b are fed by drum 46 to sorting unit 18 which is pneumatic and also connected to pneumatic system 55, and comprises a first output 60 through which the packing machine (not shown) is supplied with all the full capsules 2b with a drug weight within a given acceptance range. Sorting unit 18 also comprises a further two outputs 61 and 62 and respective pneumatic expulsion devices 63 and 64 (FIGS. 1 and 2) substantially similar to device 54 (FIG. 5), and which are operated by system 55 under control of system 21, for feeding to respective outputs 61 and 62 any full capsules 2b with a drug weight respectively above a maximum and below a minimum acceptance value.

Operation of machine 1 will now be described commencing with the steps for setting up machine 1, which must be repeated whenever capsule 2 or the metered drug is changed, followed by the steps for determining the weight of the drug content of each capsule 2.

During both setup of machine 1 and the actual production cycle, device 10 supplies an orderly succession of empty capsules 2a; and the size of drums 11, 14, 7, 46 and the spacing of the respective seats are such that seats 13 and 9 of drums 11 and 7 all contain a respective capsule, and, on drums 14 and 46, the capsules are arranged in alternate seats, i.e. with an empty seat 16, 48 between each two adjacent capsules. The initial values of coefficients K1c and K2c relative to sensors 36 and 59 are then determined by running machine 1 with only empty capsules 2a, i.e. by disabling metering unit 4, and measuring (as a function of weight) a given number of empty capsules using sensors 36 and 59, and determining the actual weights of the same empty capsules 2a using scales 24 and 50. For each empty capsule 2a, coefficients K are then determined according to the equations:

$$K1c = mc/v1c \text{ and } K2c = mc/v2c$$

For greater accuracy, the mean values of the measurements are used, which mean values are obtained by entering into the above equations the mean mass values and the mean values of the sensor 36 and 59 readings. After measuring (as a function of weight) each empty capsule 2a, both sensors 36 and 59 supply control system 21 with a no-capsule zero value, i.e. relative to the passage between the armatures of sensors 36 and 59 of the empty seats adjacent to those housing the weighed capsules 2, which values are memorized by control system 21 for correcting the in-service no-load values of sensors 36 and 59. At this point, the initial value of drug sensitivity coefficient K2p is determined by first determining the weight of a significant number of full capsules 2b by means of sensor 59, and then the weight of each of the same full capsules 2b by means of scale 50, and using equation (3). As for coefficients K1c and K2c, the mean value of coefficient K2p is calculated for greater accuracy; and, after determining the weight of each full capsule 2b, sensor 59 supplies control system 21 with a zero value corresponding to the absence of capsules 2b inside the respective seats, which zero values are memorized by control system 21 for correcting the no-load values of sensor 59 during the operating cycle.

In actual use, empty capsules 2a are fed successively through sensor 36 which, for each capsule 2a, successively supplies control system 21 with a first signal proportional to the weight of capsule 2a, and a second signal relative to the absence of capsule 2a, i.e. to the passage through sensor 36 of an empty seat 16 adjacent to that engaged by the weighed capsule 2a; and, on tire basis of the signal received from sensor 36, control system 21 determines the weight of empty capsule 2a.

Capsule 2a weighed by unit 19 is then opened in known manner; as it travels through metering unit 4, the drug is metered into bottom shell 3b; and capsule 2 is closed and fed through sensor 59 which supplies control system 21 with a first signal proportional to the weight of full capsule 2b and, like sensor 36, a second zero signal corresponding to the absence of capsules 2b inside seats 48.

As a function of the signal received from sensor 59, control system 21 then determines the weight of full capsule 2b; determines, by subtraction, the weight of the drug content of capsule 2b using equation (4); compares the weight of the drug with the memorized maximum and minimum acceptance values; and, in the event the weight of the drug falls within the acceptance range, provides for feeding capsule 2b to output 60 for supply to the packing machine (not shown).

Conversely, if the weight of the drug fails to fall within the acceptance range, control system 21 activates device 63 or 64 depending on whether the drug weight is above the maximum or below the minimum permitted value. The above steps are repeated for each capsule supplied by device 10.

As capsules 2a are fed on to drum 11, unit 19 is activated periodically and, by means of conveyor 26 and member 30, an empty capsule 2a is fed to station 23 and weighed on scale 24; the detected value is supplied to control system 21; and the weighed capsule 2a is fed back on to drum 11 by conveyor 27 and member 33 and fed to sensor 36 which, as already stated, supplies control system 21 with signal d1c and relative zero signal doc. At this point, the capsule 2a in question is filled by metering unit 4 and fed to sensor 59 which determines the weight of full capsule 2b as already described and supplies control system 21 with a corresponding signal d2p and zero signal d0p. Sorting unit 18 is then disabled, and the full capsule 2b in question is fed by system 54 along conduit 52 on to scale 50 which weighs it and also supplies a corresponding signal to control system 21. The above operations are repeated for a given number of capsules, after which, control system 21, on the basis of the above data, recalculates the values of capsule and drug coefficients Kc and Kp and, after determining the mean value of coefficients Kc and Kp, calibrates or re-sets both sensors 36 and 59 as a function of the recalculated Kc and Kp values.

Control unit 17 of machine 1 therefore provides not only for determining the drug weight of each capsule 2, but also for doing so to an extremely high degree of accuracy, by accurately determining the weight of both empty capsule 2a and full capsule 2b, and consequently, by means of a straightforward weight subtraction, the weight of the drug content of capsule 2. The drug weight is determined even more accurately by both sensors 36 and 59 being calibrated continually during the production cycle and so operating at all times on the basis of the real characteristics of both the capsules and the drug content.

Clearly, changes may be made to machine 1 as described and illustrated herein without, however, departing from the scope of the present invention. In particulars one of precision scales 24, 50 may be dispensed with; and a further sorting unit may be provided between sensor 36 and metering unit 4, for rejecting any capsules 2a found by unit 19 to be faulty or differ widely from the average characteristics of the other empty capsules. In which case, the further sorting unit must provide for supplying control system 21 with appropriate signals for disabling metering unit 4 and so preventing the drug from being metered into an empty seat vacated by a capsule 2a rejected upstream.

Moreover, in addition to changes to capacitive sensors 36 and 59 as described herein, such as substituting a fixed armature for the movable one, provision may also be made for different types of sensors operating differently from those described.

We claim:

1. A method of weighing capsules fed successively along a path to at least two sensors which, for each capsule, emits signals correlated to the weight of the capsule, the method comprising a first step for determining the weight of a number of capsules and drug metered therein by means of said at least two sensors; and a second step performed by a control device for controlling said at least two sensors and for calibrating said at least two sensors as a function of the weights of said capsules as determined by a weighing means other than the at least two sensors.

2. A method as claimed in claim 1, characterized in that said second step is performed periodically.

3. A method as claimed in claim 1 or 2, characterized in that said second calibration step comprises periodically correcting a coefficient correlating the weight of the capsules and the signals generated by the at least two sensors.

4. A method as claimed in claim 1 or 2, further comprising a third step for determining, by means of said at least two sensors, reference signals corresponding to absence of capsules, and for correcting no-load readings of the at least two sensors by means of said reference signals.

5. A method as claimed in claim 4, characterized in that determination of said reference signals and said correction of said no-load readings of the at least two sensors are performed periodically.

6. A method as claimed in claim 5, for weighing a drug metered, along said path, into empty capsules to define the content of respective full capsules, the method comprising the steps of determining the weight of each empty capsule; determining the weight of each full capsule; and determining by processing means the weight of said drug as the difference between the weight of each empty capsule and the weight of the corresponding full capsule; at least one of said steps for determining the weight of said capsules being performed by means of said first and second steps.

7. A method as claimed in claim 6, characterized in that both said steps for determining the weight of said capsules are performed by means of said first and second steps.

8. A method as claimed in claim 7, characterized in that at least one of said steps for determining the weight of said capsules comprises said third step.

9. A drug metering machine comprising conveying means for successively feeding drugs along a given path; and at least one unit for weighing the drugs; the weighing unit comprising at least one sensor located along said path and which, for each drug, emits a signal correlated to the weight of the drug; said weighing unit also comprising a weighing means other than the at least one sensor for determining the weight of a number of drugs; and control means for controlling said sensor and for calibrating the sensor as a function of the weights determined by said weighing means.

10. A machine as claimed in claim 9, for weighing a drug metered, along said path, into empty capsules to form respective full capsules, the machine further comprising a first weighing assembly for determining the weight of each empty capsule; a second weighing assembly for determining the weight of each full capsule; and processing means for determining the weight of the drug in each capsule as the difference between the weight of each full capsule and the weight of the corresponding empty capsule; at least one of said first and second weighing assemblies comprising a said weighing unit.

11. A machine as claimed in claim 10, characterized in that each of said first and second weighing assemblies comprises a respective said weighing unit.

12. A machine as claimed in claim 11, characterized in that said sensor is a capacitive sensor.

13. A method of determining a weight of drug metered within each of a plurality of capsules, the method comprising the steps of:

obtaining, by a first weighing device, a first weight of each of the plurality of capsules without drug metered therein;

metering drug into each of the plurality of capsules;

obtaining, by a second weighing device, a second weight of each of the plurality of capsules with drug metered therein;

determining the weight of drug metered within each of the plurality of capsules based on the difference of the second and first weights; and periodically calibrating the first and second weighing devices respectively according to a weight of an empty capsule and a weight of a capsule with drug metered therein as determined by a third weighing device.

14. The method of claim 13, wherein the third weighing device includes a first weighing station for determining the weight of the empty capsule and a second weighing station for determining the weight of the capsule with drug metered therein.

15. A device for weighing drug metered within each of a plurality of capsules, the device comprising:

a first weighing device for obtaining a first weight of each of the plurality of capsules without drug metered therein;

a metering unit downstream from the first weighing device for metering drug into each of the plurality of capsules;

a second weighing device downstream from the metering unit for obtaining a second weight of each of the plurality of capsules with drug metered therein;

a control unit connected to the first and second weighing devices for determining the weight of drug metered within each of the plurality of capsules based on the difference of the second and first weights; and a third weighing device connecting to the control unit for periodically weighing an empty capsule and a capsule with drug metered therein for respectively calibrating the first and second weighing devices.

16. The device of claim 15, wherein the third weighing device includes a first weighing station for weighing the empty capsule and a second weighing station for weighing the capsule with drug metered therein.

* * * * *